Figure 1:
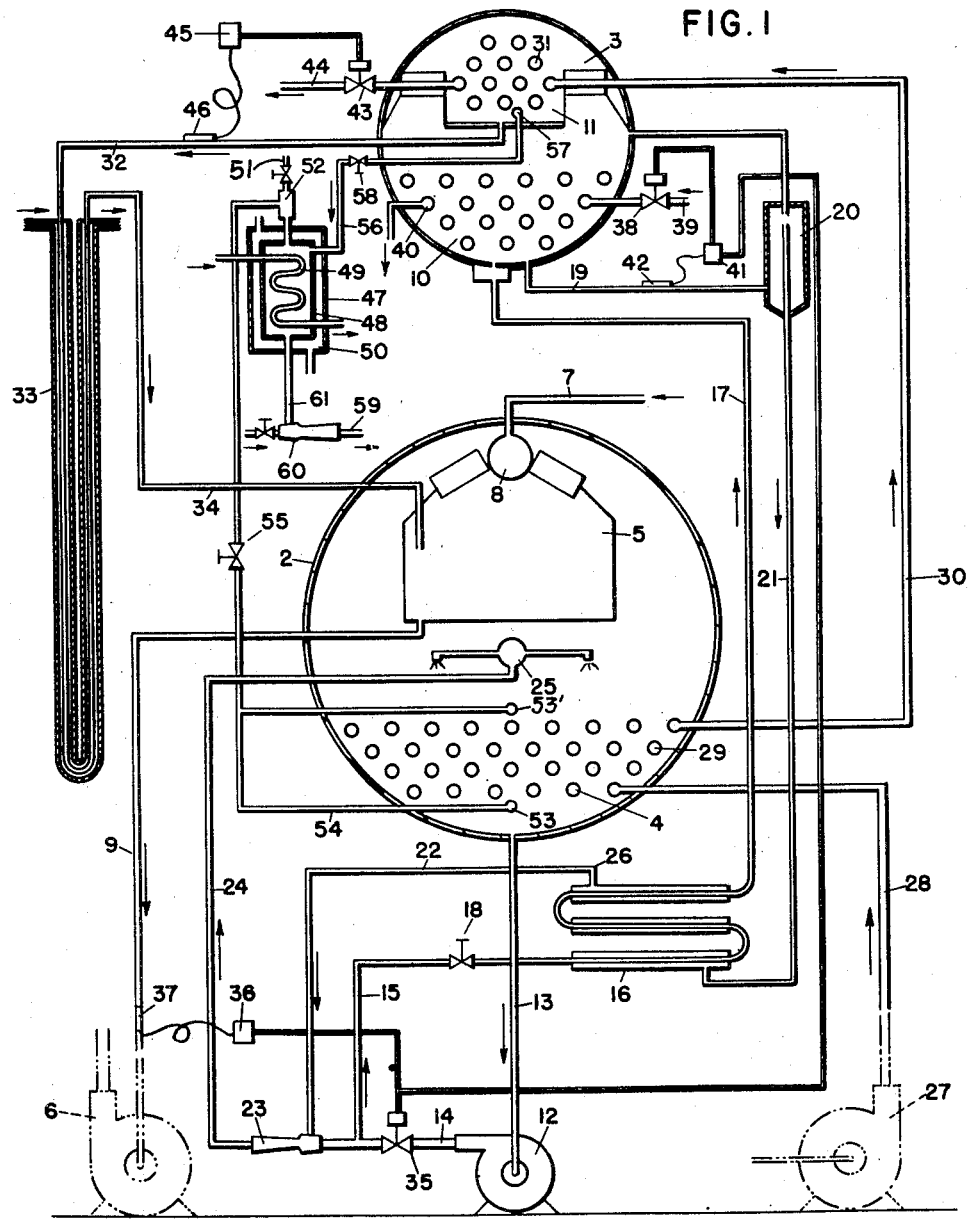

Aug. 22, 1950     A. A. BERESTNEFF     2,520,027

ABSORPTION REFRIGERATION SYSTEM

Filed May 27, 1948

*INVENTOR.*
*Alexis A. Berestneff*
BY
*Herm ___*

ATTORNEY

Patented Aug. 22, 1950

2,520,027

UNITED STATES PATENT OFFICE 2,520,027

ABSORPTION REFRIGERATION SYSTEM

Alexis A. Berestneff, Syracuse, N. Y., assignor to Carrier Corporation, Syracuse, N. Y., a corporation of Delaware Application May 27, 1948, Serial No. 29,527

10 Claims. (Cl. 62—5)

This invention relates to absorption refrigeration systems and more particularly to purge mechanism for purging the absorber and the condenser of non-condensible gases which have entered the system.

This application is in part a continuation of my co-pending application, Serial No. 683,387, filed July 13, 1946, entitled Absorption Refrigeration Systems, and relates to an absorption refrigeration system including purge mechanism for purging the absorber and the condenser of the system of non-condensible gases which have entered the system.

The chief object of the present invention is to provide an absorption refrigeration system including improved purge mechanism for purging non-condensible gases from the system.

An object of my invention is to provide purge mechanism containing a water ejector and a steam ejector to remove non-condensible gases from the system in an inexpensive, simple manner.

A further object is to provide a refrigeration system including purge mechanism by which non-condensible gases may be removed from the condenser of the system while permitting non-condensible gases to be removed simultaneously from the absorber of the system.

A still further object is to provide purge mechanism for an absorption refrigeration system containing a condensing coil for condensing steam from the ejector of the system. Other objects of my invention will be readily perceived from the following description.

This invention relates to an absorption refrigeration system which includes purge mechanism for purging the absorber and the condenser of non-condensible gases which have entered the system. The system includes a horizontally extending shell, which, in combination with a plurality of tubes extending therethrough, forms an absorber. A second shell is provided containing a generator and a condenser; means are provided for circulating solution between the absorber and the generator and between the generator and the absorber. Suitable means are also provided for forwarding condensate from the condenser to the evaporator. Refrigerant is flash cooled in the evaporator. The flashed vapor passes downward about the evaporator, to the absorber to be absorbed by solution therein. In the generator, substantially the same amount of vapor is boiled out, passed to the condenser, is condensed and returned to the chilled water circuit. Rarefied vapor in the absorber evaporator shell serves to insulate the evaporator from the ambient atmosphere. Control arrangements are provided for maintaining the capacity of and the concentration of solution in the system, as well as pressure, temperature of cooling water and the flow of solution and of condensing water. Purge mechanism, including a steam ejector and a water ejector disposed in series, is provided to withdraw air or other non-condensible gases from the absorber and the condenser. A heat exchanger is provided to place the strong and weak solutions in heat exchange relation with one another, thereby decreasing the cost of operation of the system.

Figure 2:
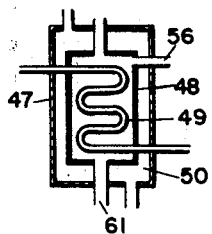

The attached drawings illustrate a preferred embodiment of my invention in which:

Figure 1 is a diagrammatic view illustrating the flow of solution through the various elements of the refrigeration system; and Figure 2 is an enlarged diagrammatic view of the purge mechanism.

Referring to the drawings there are shown horizontally extending drums or shells 2 and 3. Shell 3 preferably is secured in place above shell 2. Shell 2 encloses a longitudinally extending absorber arrangement 4 and longitudinally extending evaporator arrangement 5 disposed above the absorber 4. Chilled water treated by this system is circulated by a pump 6 through an air conditioning device of any desired character (not shown); and is returned from the air conditioning device to the evaporator 5 through line 7. The chilled water is sprayed in evaporator 5 by a suitable spray arrangement 8, the chilled water being flash cooled in the evaporator and being drawn from the evaporator through line 9 by pump 6 and again forwarded to the air conditioning device.

Shell 3 encloses a longitudinally extending generator arrangement 10 and a longitudinally extending condenser arrangement 11, disposed above the generator 10. Weak solution is withdrawn from absorber 4 by pump 12 through line 13 and is forwarded to the generator 10 through lines 14, 15, heat exchanger 16 and line 17. A restriction 18 may be disposed in line 15. Strong solution is withdrawn from generator 10 through line 19, overflow arrangement 20, line 21, heat exchanger 16 and line 22 to an ejector 23 which forwards strong solution through line 24 to the spray arrangement 25 of absorber 4. Line 22 is looped as shown at 26 to assure a satisfactory quantity of strong solution in the heat exchanger for heat exchange purposes. The strong and weak solution lines above described are disposed in heat exchange relation by means of heat exchanger 16. Solution overflow arrangement 20 serves to prevent solution in the generator 10 rising above or sinking below a predetermined level.

The term "weak solution" is used herein to define a solution containing a large amount of refrigerant so that the solution is weak in absorbing properties. The term "strong solution" defines a solution which is relatively deficient in refrigerant and consequently a solution which possesses enhanced properties of refrigerant absorption.

Various combinations of refrigerants and absorber may be used in the present system. I have found that a solution consisting of lithium bromide and water is highly satisfactory for use. Other salt solutions may be used if desired in this system. When this system is operated at high temperatures (above freezing temperature); a solution of lithium chloride and water or a solution of sodium hydroxide and water may be used. When the present system is used to attain low temperature ammonia may be used as a refrigerant.

A pump 27 passes cooling or condensing water through line 28 to the coil 29 of absorber 4 and then forwards the water after its passage through absorber 4, through line 30 to the coil 31 of condenser 11. After passage through coil 31, the water is discharged or, if desired, may be reused as in the case of a cooling tower.

A line 32 serves to withdraw vapor condensate from condenser 11, the vapor condensate passing through a precooler assembly 33 and then being returned through line 34 to evaporator 5. Condensate pre-cooler 33 consists of a double pipe assembly in which a cooling medium is passed in heat exchange relation with the vapor condensate. Pre-cooler 30 is shaped in the form of a loop to maintain a secure liquid seal between shells 2 and 3 thus permitting different pressures to be maintained in such shells without escape of vapor.

Valve 35 is placed in line 14 between ejector 23 and pump 12. It serves to control or regulate flow of solution through the system. Valve 35 is actuated by a thermostat control 36 operated by a bulb 37 placed in or adjacent to line 9. As the temperature of chilled water passing through line 9 decreases thermostat 36 in accordance therewith tends to move valve 35 toward a closed position, thereby decreasing the amount of weak solution being forwarded to generator 10 through lines 15 and 17, proportionally to the decrease in the temperature of the chilled water. Movement of valve 35 toward a closed position also decreases proportionally the amount of weak solution passing to ejector 23. The reduction in the amount of weak solution passing to ejector 23 reduces the velocity of such solution through the nozzle of the ejector and consequently a smaller quantity of strong solution is entrained or induced from line 22.

Valve 38 is provided in steam line 39 to control the amount of steam passing into the tubes 40 of generator 10 in accordance with the load imposed upon the system. Valve 38 is actuated by thermostat control 41, operated in turn by a bulb 42, disposed in or adjacent to line 19.

The amount of condensing water passing through condenser 11 is regulated by means of a valve 43 placed in line 44, actuated by thermostat control 45, controled by bulb 46 disposed in or adjacent to vapor condensate line 32.

The above absorption refrigeration system is described in detail in my co-pending application, Serial No. 683,387, filed July 13, 1946, of which the present case is in part a continuation.

A suitable purge arrangement 47 is provided to purge condenser 11 and absorber 4 of air or other non-condensible gases. Purge 47 may operate intermittently or continuously as desired. Purge arrangement 47 includes a housing or casing 48 containing a condensing coil 49 through which condensing water is passed. If desired, casing 48 may be surrounded by a water cooled jacket 50. A steam line 51 is connected to housing 48 as shown in Figures 1 and 2, and an ejector 52 is disposed in steam line 51. A purge pipe 53 extends longitudinally of absorber 4 and has openings therein to suck in air and other non-condensible gases collected in absorber 4. Pipe 53 is connected by means of line 54 to ejector 52. A valve 55 is disposed in the line to permit it to be closed when desired.

It will be noted a second purge pipe 53' extends longitudinally of absorber 4. Pipe 53' is similar to pipe 53 but is disposed above the tubes forming the absorber; provision of pipe 53' assures purging of the absorber even if the whole solution charge is stored in the absorber. It will be appreciated when the machine is started, purging is accomplished through the second purge pipe 53'. After the machine is started and the solution is properly distributed throughout the system pipe 53 functions together with pipe 53' to purge the absorber evaporator shell. Purge pipe 53' is likewise connected to ejector 52 by means of line 54. Passage of steam through ejector 52 entrains air and other non-condensible gases from absorber 4 through line 54 when valve 55 is open. The steam and entrained gases are carried into housing 48 where a large part of the steam is condensed by its heat exchange relation with the water in coil 49.

Housing 48 is also connected by means of line 56 to a purge pipe 57 which extends longitudinally of condenser 11 and has openings therein to gather air and other non-condensible gases collecting in condenser 11. Pressure in housing 48 is less than pressure in shell 3; consequently air and other non-condensible gases flow through line 56 to housing 48. A valve 58 is disposed in line 56 to permit it to be closed when desired. Likewise, suitable valves (not shown) may be disposed in steam line 51 if desired and in auxiliary water line 59 hereinafter described.

An auxiliary water line 59 is provided in which is placed a water ejector 60, connected to housing 48 by line 61. Passage of water through ejector 60 entrains the liquid and gases in housing 48 thus assuring their removal from the system. The steam and water used to actuate the purge may be obtained from the same sources of supply used to provide the generator with steam and the absorber and condenser with cooling water.

The purge arrangement may be operated either intermittently or continuously. Preferably, the purge arrangement operates continuously although the absorption system described may be maintained in a condition substantially free from non-condensible gases by intermittent operation of the water ejector purge arrangement.

It will be noted the condenser of purge arrangement 47, formed by housing 48 and condensing coil 49, is disposed some distance above absorber 4. Such position of purge 47 is of particular value, when as occurs under some circumstances, the liquid level in absorber 4 rises above purge pipe 53. Ejector 52 is so disposed that under such conditions, it cannot raise liquid to a height sufficient to withdraw solution from this system but is adequate to withdraw air and other non-condensible gases from absorber 4 when the liquid level in the absorber is such as to permit such gases to be withdrawn through purge pipe 53. Even though the liquid level in absorber 4 is above pipe 53, operation of purge 47 does not remove liquid from the absorber. The purge line in the condenser is above the liquid level therein, so that the purge does not remove liquid from the condenser even though some minor amount of vapor may be withdrawn by the purge.

The present invention provides an absorption refrigeration system including improved purge mechanism which readily and inexpensively assures that the system remains free of non-condensible gases which have entered from ambient atmosphere. Arranging the absorber below the evaporator of this system serves to concentrate non-condensible gases at the bottom of the absorber so that such non-condensible gases can be removed easily by the purge mechanism. The pressure in the condenser of the system is greater than pressure in the housing of the purge mechanism; thus non-condensible gases are forced from the condenser to the housing of the purge mechanism from which such gases may be readily removed by the water ejector.

While I have described a preferred embodiment of my invention, it will be understood my invention is not limited thereto since it may be otherwise embodied within the scope of the following claims.

I claim:

1. In an absorption refrigeration system, the combination of a member having a region in which non-condensible gases collect and means for removing the non-condensible gases from the member, said means comprising a casing, a coil in said casing through which cooling medium is passed, a steam ejector connected to the casing, a line connecting the ejector with said member, passage of steam through the ejector withdrawing non-condensible gases from said member and forwarding the same to the casing, the steam being placed in heat exchange relation with said coil, and a water ejector connected to the casing, passage of water through the water ejector withdrawing condensate and non-condensible gases from the housing and removing them from the system.

2. In an absorption refrigeration system, the combination of a member having a region in which non-condensible gases collect, a second member having a region in which non-condensible gases collect, and means for removing the non-condensible gases from said members, said means comprising a casing, a coil in said casing through which cooling medium is passed, a line connecting the casing with said second member, pressure in said second member being greater than pressure in said casing whereby non-condensible gases in said second member flow to said casing, a steam ejector connected to the casing, a line connecting the first member with casing, a line connecting the first member with the steam ejector, passage of steam through the ejector withdrawing non-condensible gases from the first member and forwarding the same to the casing, the steam being placed in heat exchange relation with said coil, and a water ejector connected to the casing, passage of water through the water ejector withdrawing condensate and non-condensible gases from the casing and removing them from the system.

3. In an absorption refrigeration system, the combination of a horizontally extending shell cooperating with a first member in said shell cooperating therewith to form an absorber, a second member in said shell cooperating therewith to form an evaporator, vapor from the evaporator passing to the absorber and means for removing non-condensible gases from the absorber, said means comprising a casing, a coil disposed in said casing through which cooling medium is passed, a steam ejector connected to the casing, a purge line disposed in said absorber, a line connecting the purge line with the steam ejector, passage of steam through the ejector withdrawing non-condensible gases from the absorber and forwarding the same to the casing, the steam being condensed in said casing, and a water ejector connected to the casing, passage of water through the water ejector withdrawing condensate and non-condensible gases from the casing and removing them from the system.

4. In an absorption refrigeration system, the combination of a horizontally disposed shell, a member in said shell cooperating therewith to form an absorber, a second member in said shell cooperating therewith to form an evaporator serving to flash cool refrigerant, the flashed vapor passing to the absorber to be absorbed by the solution therein, a second shell disposed adjacent said first shell, a member in said second shell cooperating therewith to form a generator, a second member in the second shell cooperating therewith to form a condenser, the generator serving to vaporize refrigerant which is condensed in the condenser, a pump for withdrawing weak solution from the absorber and for forwarding the weak solution to the generator, an ejector, said pump serving to pass a portion of weak solution into the ejector, the discharge of weak solution in the ejector serving to entrain strong solution from the generator and to supply the mixture to the absorber and means to purge the condenser and the absorber of non-condensible gases, said means comprising a housing, a steam line connected to the housing, an ejector in said steam line, a line connecting the ejector with the absorber whereby passage of steam at high velocity through said ejector entrains gases from said line, a cooling coil in the housing adapted to condense steam discharged into said housing, a second line connecting the shell with the condenser, pressure in said condenser being greater than pressure in said shell so that non-condensible gases are forced into the purge housing, a water line, a second ejector disposed in said water line, and a line connecting said purge housing to said second ejector, passage of water at high velocity through said second ejector, serving to entrain matter in said purge housing and to discharge the same from the system.

5. In an absorption refrigeration system, the combination of a horizontally extending shell containing members therein cooperating therewith to form an absorber and an evaporator, a second horizontally extending shell disposed adjacent the first shell, said second shell containing members therein cooperating with the second shell to form a generator and a condenser, pressure in said second shell being greater than the pressure in said first shell, and means for purging the absorber and the condenser of non-condensible gases, said means comprising a casing, a coil in said casing through which cooling medium is passed, pressure in said casing being greater than the pressure in said absorber and being less than the pressure in said condenser, a line connecting the condenser and the casing, non-condensible gases flowing to said casing from the condenser, a steam ejector connected to the casing, a purge line disposed in the absorber, a line connecting the purge line with the steam ejector, passage of steam through the ejector withdrawing non-condensible gases from the absorber and forwarding the same to the casing, the steam being placed in heat transfer relation with cooling medium in said coil to condense the same and a water ejector connected to said casing, passage of water through said ejector withdrawing condensate and non-condensible gases from said casing and removing them from the system.

6. An absorption refrigeration system according to claim 5 in which a control is provided in the steam line to regulate passage of steam therethrough and a second control is provided in the water line to regulate passage of water therethrough.

7. An absorption refrigeration system according to claim 5 in which the condensing casing is disposed above the first shell a distance sufficient to prevent withdrawal of solution from the system.

8. An absorption refrigeration system according to claim 5 in which the steam supplied to the steam ejector is withdrawn from the source of supply which supplies steam to the generator and in which the water supplied to the water ejector is withdrawn from the source of supply which provides cooling water to the absorber.

9. In an absorption refrigeration system, the combination of a horizontally extending shell containing members therein cooperating with the shell to form an absorber and an evaporator, a second horizontally extending shell containing members therein cooperating with the second shell to form a generator and a condenser, pressure in said second shell being greater than pressure in said first shell, a source of supply for furnishing cooling water to said absorber and said condenser, a second source of supply for furnishing steam to said generator and means for withdrawing non-condensible gases from said absorber and said condenser, said means including a casing located above the absorber a distance sufficient to prevent withdrawal of solution from the absorber, pressure in said casing being greater than pressure in said absorber and being less than pressure in said condenser, a steam line connecting the second source of supply and the casing, an ejector in said steam line, a purge line in said absorber, a line connecting the purge line and said ejector, passage of steam through the ejector withdrawing non-condensible gases from the absorber and forwarding the same with the steam to the casing, steam being condensed in said casing by passage through said coil, a line connecting the condenser and the casing, non-condensible gases flowing from the condenser through said line to the casing, a water line, a second ejector in the water line, a line connecting the casing and the second ejector, passage of water through the second ejector withdrawing non-condensible gases and condensate from the casing and removing them from the system.

10. In an absorption refrigeration system, the combination of a horizontally extending shell cooperating with a first member in said shell cooperating therewith to form an absorber, a second member in said shell cooperating therewith to form an evaporator, vapor from the evaporator passing to the absorber, and means for removing non-condensible gases from the absorber, said means comprising a casing, a coil disposed in said casing through which cooling medium is passed, a steam ejector connected to the casing, a purge line disposed in said absorber beneath the absorber tubes, a secondary purge line disposed in the absorber above said absorber tubes, a line connecting the purge lines with the steam ejector, passage of steam through the ejector withdrawing non-condensible gases from the absorber and forwarding the same to the casing, the steam being condensed in said casing and a water ejector connected to the casing, passage of water through the water ejector withdrawing condensate and non-condensible gases from the casing and removing them from the system.

ALEXIS A. BERESTNEFF.

REFERENCES CITED

The following references are of record in the file of this patent:

UNITED STATES PATENTS

| Number | Name | Date |
| --- | --- | --- |
| 2,374,521 | Anderson | Apr. 24, 1945 |